(12) United States Patent
Le Quere et al.

(10) Patent No.: US 7,344,165 B2
(45) Date of Patent: Mar. 18, 2008

(54) INSTANTANEOUS CONNECTION DEVICE

(75) Inventors: Philippe Le Quere, Betton (FR);
Nicolas Le Bars, Thorigne (FR)

(73) Assignee: Legris SA, Rennes (FR)

( * ) Notice: Subject to any disclaimer, the term of this patent is extended or adjusted under 35 U.S.C. 154(b) by 171 days.

(21) Appl. No.: 10/557,669

(22) PCT Filed: May 11, 2004

(86) PCT No.: PCT/FR2004/001142

§ 371 (c)(1),
(2), (4) Date: Nov. 22, 2005

(87) PCT Pub. No.: WO2004/109176

PCT Pub. Date: Dec. 16, 2004

(65) Prior Publication Data

US 2007/0057506 A1    Mar. 15, 2007

(30) Foreign Application Priority Data

May 28, 2003  (FR) .................................... 03 06487

(51) Int. Cl.
F16L 37/00 (2006.01)
F16L 37/18 (2006.01)
F16L 21/06 (2006.01)
F16L 21/02 (2006.01)

(52) U.S. Cl. ...................... 285/307; 285/315; 285/322; 285/345; 285/346; 285/369

(58) Field of Classification Search ................ 285/307, 285/314, 315, 322, 323, 345, 346, 369, 375

See application file for complete search history.

(56) References Cited

U.S. PATENT DOCUMENTS

| 1,995,109 | A | * | 3/1935 | Smittle | 285/266 |
|---|---|---|---|---|---|
| 2,111,740 | A | * | 3/1938 | Ruane | 285/375 |
| 3,127,196 | A | * | 3/1964 | Fabian, Jr. et al. | 285/111 |
| 3,603,619 | A | * | 9/1971 | Bengesser et al. | 285/45 |
| 3,924,877 | A | * | 12/1975 | Leopold et al. | 285/340 |
| 4,126,339 | A | * | 11/1978 | Thompson | 285/369 |
| 4,637,636 | A | * | 1/1987 | Guest | 285/38 |
| 5,799,988 | A | * | 9/1998 | Yeh | 285/323 |
| 6,231,090 | B1 | * | 5/2001 | Fukao et al. | 285/340 |
| 6,854,772 | B2 | * | 2/2005 | Weller et al. | 285/314 |
| 7,195,286 | B2 | * | 3/2007 | Hama | 285/322 |
| 2004/0232693 | A1 | * | 11/2004 | Legeay | 285/305 |
| 2007/0120362 | A1 | * | 5/2007 | Poder | 285/314 |

FOREIGN PATENT DOCUMENTS

| AT | 357 832 | 8/1980 |
|---|---|---|
| GB | 2 150 243 | 6/1985 |
| GB | 21 292 780 | 3/1996 |

* cited by examiner

*Primary Examiner*—James M. Hewitt
(74) *Attorney, Agent, or Firm*—Young & Thompson

(57) ABSTRACT

An instantaneous connection device includes a tubular body, a tight element used to hold the end of a line in the body and includes an elastically deformable annular sealing element and a holding element that are arranged to receive the end of the line, a cam member for moving the holding element from a free state into a state wherein it grips the end of the line when it is axially displaced in the tubular body from a first position to a second position, and an elastic member for bringing the holding element back towards its second position. The sealing element is mounted between a radial shoulder of the body and a radial face of the holding element. The radial shoulder and the radial face are provided with reciprocal reliefs for laterally coming into contact with the annular sealing element.

5 Claims, 2 Drawing Sheets

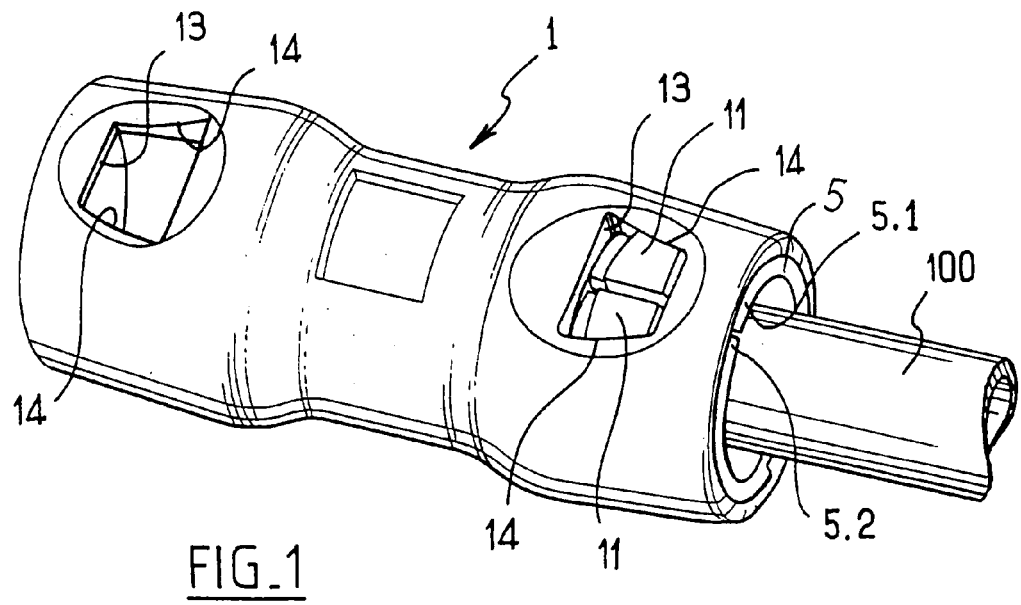
FIG_1
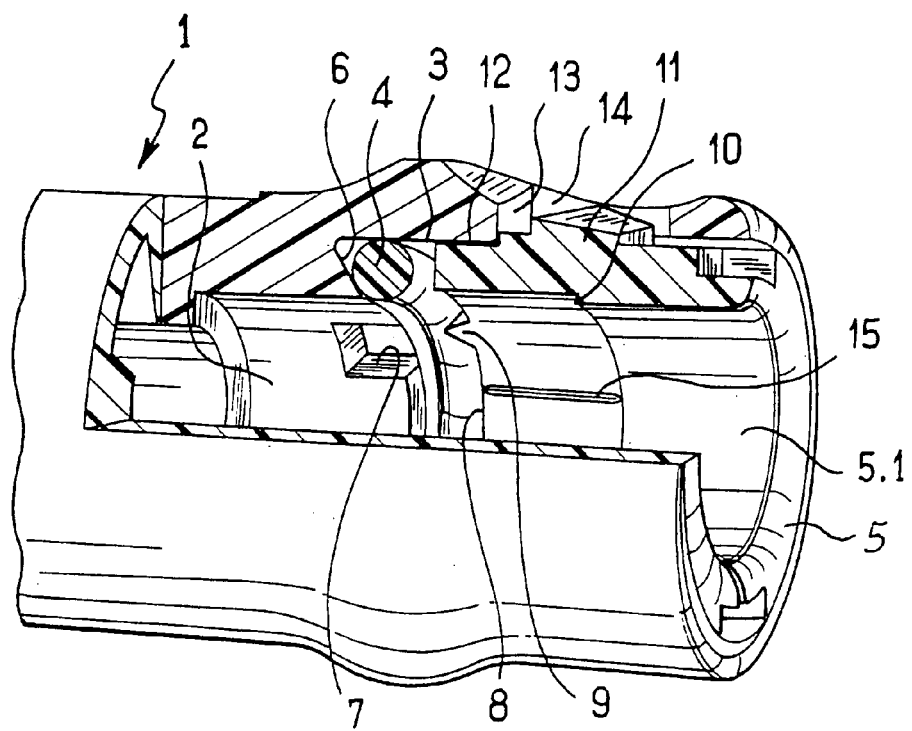
FIG_2

INSTANTANEOUS CONNECTION DEVICE

The present invention relates to an instantaneous coupling device suitable for connecting a pipe end to an element of a fluid transport circuit. The element may be another pipe, a fluid emitter element such as a pump, or a fluid receiver element such as a tank.

BACKGROUND OF THE INVENTION

An instantaneous coupling device generally comprises a tubular body and means for retaining a pipe in the body in leaktight manner. These means comprise an elastically deformable annular sealing element and a retaining member which are arranged to receive the pipe end. Cam means are interposed between the body and the retaining member to bring the retaining member from a release state in which it releases the pipe end to a grip state in which it grips the pipe end, on the retaining member being displaced axially inside the tubular body from a first position to a second position. Means are provided for resiliently returning the retaining member towards its second position, and by returning the retaining member into said position they tend to hold it in its grip state gripping the pipe end.

Thus, when a pipe end is inserted into the body of the coupling device, it encounters the retaining member in its second position and pushes it back into its first position, thereby putting it into its release state, enabling the pipe end to pass into the retaining member and come into contact with the sealing element. Under the effect of the resilient return means, the retaining member tends to return towards its second position and into its grip state. The resilient return means thus limit the extent to which the pipe end reverses when the fluid transport circuit in which the coupling device is located is put under pressure. The resilient return means also enable a fraction of the operating clearance of the retaining member to be taken up.

The resilient return means are generally constituted by a helical spring mounted between a shoulder in the body and a shoulder on the retaining member. The presence of the spring complicates the design of the coupling device and requires an additional assembly operation.

OBJECT OF THE INVENTION

An object of the present invention is to provide an instantaneous coupling device possessing a structure that is simple while incorporating means for resiliently returning the retaining member.

BRIEF SUMMARY OF THE INVENTION

To this end, the invention provides an instantaneous coupling device comprising a tubular body and retaining means for retaining a pipe end in leaktight manner in the body, said means comprising an elastically deformable annular sealing element and a retaining member that are arranged to receive the pipe end, cam means for bringing the retaining member from a release state in which it releases the pipe end to a grip state in which it grips the pipe end when the retaining member is moved axially in the tubular body from a first position to a second position, and means for resiliently returning the retaining member towards its second position, the sealing element being mounted between a radial shoulder of the body and a radial face of the retaining member in order to form the resilient return means for returning the retaining member towards its second position, and the radial shoulder of the body and the radial face of the retaining member presenting complementary portions in relief to bear laterally against the annular sealing element.

Thus, in addition to performing its sealing function, the annular sealing element performs an additional function of resiliently returning the retaining member. By enabling the sealing element to perform two functions, this arrangement simplifies the structure of the coupling device.

The arrangement of the complementary portions in relief on the radial shoulder of the body and on the radial face of the retaining member make it possible to use the stretching of the gasket to define the stroke of the retaining member. The stroke then obtained is greater than that which would result merely from flattening the gasket.

Advantageously, the shoulder of the body includes a convex frustoconical surface.

Thus, the gasket can be pushed against the convex frustoconical surface which tends to cause the annular sealing element to expand. This allows the gasket to move, making it possible to obtain a relatively long stroke for the retaining member, with the annular sealing element tending to return to its initial position because of its elasticity, thereby returning the retaining member into its second position.

Other characteristics appear on reading the following description of a particular and non-limiting embodiment of the invention.

BRIEF DESCRIPTION OF THE DRAWINGS

Reference is made to the accompanying drawings, in which:

FIG. 1 is a perspective view of a coupling device in accordance with the invention;

FIG. 2 is a partially cutaway fragmentary perspective view of the coupling device.

DETAILED DESCRIPTION OF THE INVENTION

Figure 3:
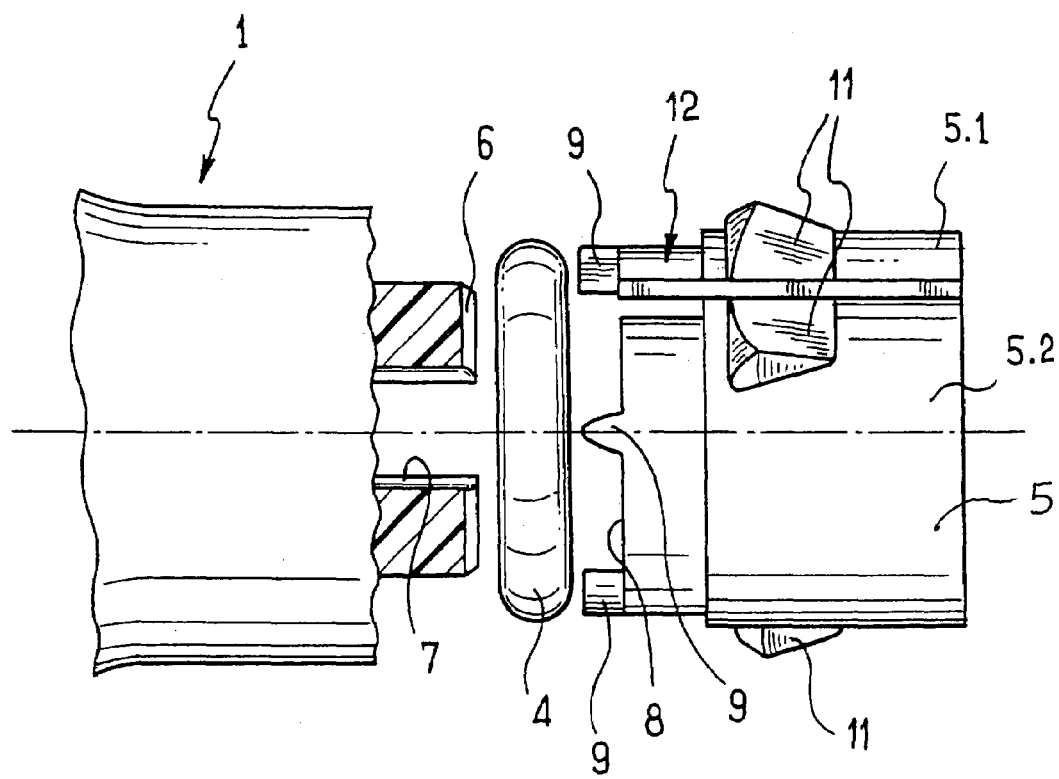
FIG. 3 is an exploded fragmentary elevation view of the coupling device.

The coupling device of the invention as shown herein is a coupling for connecting together two pipe ends 100 (only one is visible in FIG. 1). The invention is equally applicable to coupling a pipe end to an element of a fluid transport circuit, which element may be a fluid emitter such as a pump, or a fluid receiver such as a tank.

The coupling comprises a body given overall reference 1 that is of tubular shape, defining a stepped channel having a central segment 2 and end segments 3 each receiving means for retaining a respective pipe end 100 in leaktight manner in the body 1. In this example the body is symmetrical and the leaktight retaining means housed in each of the ends of the body 1 are identical. When coupling a pipe end to an element of a fluid transport circuit, the coupling can have an end that is integral with the element of the circuit or that is mounted on the element of the circuit in conventional manner by snap-fastening, by forced engagement, or by using any other releasable or permanent fastener means.

The leaktight retaining means also comprise a sealing element 4 and a retaining member 5 which are arranged to receive the pipe end.

The sealing element 4 is constituted by an elastomer O-ring gasket having an inside diameter that is slightly smaller than an outside diameter of the pipe end 100. The sealing element 4 is adjacent to a shoulder 6 extending between the end segment 3 and the central segment 2. The shoulder 6 is defined by a convex frustoconical surface having setbacks 7 formed axially therein.

In this example, the retaining member 5 comprises two jaws 5.1 and 5.2 each in the form of a half-tube. Each jaw 5.1, 5.2 has a radial end face 8 having tongues 9 projecting radially therefrom in register with the setbacks 7. The jaws 5.1 and 5.2 are mounted in the end segment 3 to slide parallel to the direction in which the pipe end 100 is inserted between successive first and second positions in the direction opposite to the insertion direction of the pipe end 100. When the retaining member 5 is in the first position, the sealing element 4 is flattened and stretched between the shoulder 6 and the tongues 9, with the tongues 9 and the setbacks 7 defining chicanes in which the sealing element 4 extends. The tongues 9 and the setbacks 7 are disposed symmetrically in this example. There could be some other number of them. The sealing element 4 is also expanded radially because of the slope of the convex frustoconical surface forming the shoulder 6. When the retaining element 5 is in the second position (FIG. 2), the sealing element 4 is in a state of smaller deformation such that it tends to urge the retaining member 5 resiliently into this position.

Each jaw 5.1, 5.2 has an inside surface provided with teeth 10.

Two studs 11 extend transversely, projecting from the outside surface 12 of each jaw 5.1, 5.2 in the vicinity of the longitudinal edges of the jaws 5.1, 5.2. The adjacent studs 11 of two jaws 5.1 and 5.2 are received in holes 13 formed through the wall of the body 1, opening out on both sides of the wall. The holes 13 extend longitudinally relative to the body 1 and present two side faces 14 that diverge apart from each other in the direction in which the pipe end 100 is inserted into the body 1. The side faces 14 co-operate in sliding with the studs 11 like cams for bringing the retaining member 5 from a release state in which it releases the pipe end 100, to a grip state in which it grips the pipe end 100 when the retaining member 5 is moved in the body 1 from its first position towards its second position. In the release state, the jaws define a diameter for passing the pipe end 100 that is substantially equal to the outside diameter of the pipe end. In the grip state, the teeth 10 bite into the outside surface of the pipe end 100.

The body 1 has annular indexing means for indexing the angular position of the retaining member 5 relative to the body 1. By way of example, these means comprise an internal tongue received between the two jaws 5.1 and 5.2. Under such circumstances, the two jaws 5.1 and 5.2 preferably also include locking means preventing the pipe end 100 from turning relative to the jaws. These means comprise elongate teeth 15 extending axially and projecting inwards into the retaining member 5.

When the pipe end 100 is inserted into the body 1, the pipe end 100 comes into abutment against the retaining member 5 while it is in its grip state and pushes it back from the second position towards the first position against the force exerted on the retaining member by the sealing element 4. When the retaining member 5 reaches its first position, the sealing element 4 is pushed back by the retaining member 5 onto the shoulder 6 where it is expanded radially and stretched by the chicanes formed by the setbacks 7 and the tongues 9. The retaining member 5 is moved into its release state under the axial penetration force exerted by the pipe. The retaining member then allows the pipe end 100 to pass and become inserted by force into the sealing element 4 until it comes into abutment against a shoulder situated in the central segment 2. The pipe is made easier to insert into the sealing element, by the sealing element being expanded radially on the frustoconical portion of the shoulder 6 and by it being stretched in the chicanes, with these deformations also serving to reduce the cross-section of the sealing element 4. This reduces the need to have recourse to lubricating the sealing element in order to facilitate insertion of the pipe, where lubrication is an operation that is difficult to perform repeatably.

The sealing element 4 tends to return to its state of smaller deformation so it slides on the frustoconical surface of the shoulder 6 and relaxes, thereby pushing the retaining member 5 towards its second position.

During the movement of the retaining member 5 from its first position towards its second position, the studs 11 and the side surfaces 14 in the hole 13 co-operate so as to bring the retaining member 5 from its release state towards its grip state.

The sealing element 4 thus initiates clamping of the retaining member 5 on the pipe end, such that when a traction force is exerted on the pipe or when the circuit is put under pressure, the pipe reverses and entrains the retaining member into its second position. The sealing element 4 thus serves to compensate in part for the operating clearance of the retaining member 5, and to limit the extent to which the pipe end 100 reverses when the fluid transport circuit to% which they belong is put under pressure.

Naturally, the invention is not limited to the embodiment described and various embodiments could be provided without going beyond the ambit of the invention as defined by the claims.

Although the invention is described with reference to a retaining member constituted by jaws, the invention is applicable to any type of retaining member that is axially movable in the body of the coupling device, and for example to a retaining member formed by a tube having axial slots formed in one end thereof to define deformable claws.

In addition, the sealing element may present shapes other than a square section and it may be formed by a gasket having lobes or by some other form of gasket.

The shoulder 6 could be of some other shape, for example it could be constituted by a radial surface optionally provided with tongues or setbacks.

The complementary portions in relief could be of any shape suitable for forming a chicane serving to stretch the sealing element.

The complementary portions in relief preferably comprise at least two tongues 9 projecting from the radial face 8 of the retaining member 5 and at least two setbacks 7 in the radial shoulder 6 of the body 1 facing the tongues.

What is claimed is:

1. An instantaneous coupling device comprising a tubular body (1) and retaining means for retaining a pipe end in leaktight manner in the body, said means comprising an elastically deformable annular sealing element (4) and a retaining member (5) that are arranged to receive the pipe end, cam means (11, 14) for bringing the retaining member from a release state in which it releases the pipe end to a grip state in which it grips the pipe end when the retaining member is moved axially in the tubular body from a first position to a second position, and means for resiliently returning the retaining member towards its second position, wherein the sealing element is mounted between a radial shoulder (6) of the body and a radial face (8) of the retaining member in order to form the resilient return means for returning the retaining member towards its second position, and wherein the radial shoulder (6) of the body (1) and the radial face (8) of the retaining member (5) present complementary portions in relief (7, 9) to bear laterally against the annular sealing element (4).

2. A device according to claim 1, wherein the complementary portions in relief comprise at least two tongues (9) projecting from the radial face (8) of the retaining member (5), and at least two setbacks (7) in the radial shoulder (6) of the body (1) facing the tongues.

3. A device according to claim 1, including angular indexing means (11, 14) for indexing the angular position of the retaining member (5) relative to the body (1).

4. A device according to claim 3, including means (15) for preventing the pipe end (100) from turning relative to the retaining member (5).

5. A device according to claim 1, wherein the shoulder (6) of the body (1) has a convex frustoconical surface.

* * * * *